US012379683B2

(12) United States Patent
Kikuchi

(10) Patent No.: US 12,379,683 B2
(45) **Date of Patent: *Aug. 5, 2025**

(54) HEATING DEVICE WITH THERMOMETERS AND THERMOSTATS ALTERNATELY ARRANGED ON A HEAT CONDUCTOR

(71) Applicant: Toshiba Tec Kabushiki Kaisha, Tokyo (JP)

(72) Inventor: Kazuhiko Kikuchi, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,305

(22) Filed: Feb. 29, 2024

(65) Prior Publication Data

US 2024/0201621 A1 Jun. 20, 2024

Related U.S. Application Data

(63) Continuation of application No. 18/332,772, filed on Jun. 12, 2023, now Pat. No. 11,982,959, which is a (Continued)

(30) Foreign Application Priority Data

Feb. 8, 2019 (JP) ................................ 2019-021852

(51) Int. Cl.
*G03G 15/20* (2006.01)

(52) U.S. Cl.
CPC ..... *G03G 15/2039* (2013.01); *G03G 15/2042* (2013.01); *G03G 15/2053* (2013.01)

(58) Field of Classification Search
CPC ........... G03G 15/2039; G03G 15/2042; G03G 15/2053; G03G 2215/2035; H05B 1/0241;
(Continued)

(56) References Cited

U.S. PATENT DOCUMENTS

| | | | |
|---|---|---|---|
| 9,529,310 | B2 | 12/2016 | Nakayama |
| 2003/0198481 | A1 | 10/2003 | Kikuchi et al. |

(Continued)

FOREIGN PATENT DOCUMENTS

| | | | | |
|---|---|---|---|---|
| EP | 3276429 | A1 * | 1/2018 | ......... G03G 15/2039 |
| JP | 2002221872 | A | 8/2002 | |

(Continued)

OTHER PUBLICATIONS

Extended European Search Report mailed Jul. 10, 2020 in corresponding European Patent Application No. 20156018.2, 7 pages.

(Continued)

*Primary Examiner* — Robert B Beatty
(74) *Attorney, Agent, or Firm* — Kim & Stewart LLP

(57) ABSTRACT

A heating device includes a substrate, one or more heating elements arranged along the substrate, a heat conductor contacting the substrate, a plurality of thermometers each configured to measure a temperature of the heat conductor, and a plurality of thermostats each configured to measure a temperature of the heat conductor and interrupt electrical power supplied to the heating elements. The thermometers and the thermostats are alternately arranged in a longitudinal direction of the substrate.

20 Claims, 5 Drawing Sheets

Related U.S. Application Data continuation of application No. 17/944,154, filed on Sep. 13, 2022, now Pat. No. 11,714,369, which is a continuation of application No. 17/562,867, filed on Dec. 27, 2021, now abandoned, which is a continuation of application No. 17/322,755, filed on May 17, 2021, now Pat. No. 11,237,505, which is a continuation of application No. 16/734,215, filed on Jan. 3, 2020, now Pat. No. 11,042,109.

(58) Field of Classification Search
CPC .......... H05B 3/0066; H05B 3/20; H05B 3/26; H05B 2213/03; H05B 2213/07
USPC .......... 399/69, 329, 330, 334, 335; 219/216, 219/240, 241, 244, 264, 494, 510
See application file for complete search history.

(56) References Cited

U.S. PATENT DOCUMENTS

| | | | | |
|---|---|---|---|---|
| 2005/0185977 | A1 | 8/2005 | Kamei | |
| 2005/0226645 | A1 | 10/2005 | Sone et al. | |
| 2008/0118266 | A1 | 5/2008 | Nakayama et al. | |
| 2011/0064441 | A1 | 3/2011 | Morihara | |
| 2012/0107003 | A1 | 5/2012 | Hasegawa | |
| 2015/0037052 | A1 | 2/2015 | Muramatsu et al. | |
| 2015/0139706 | A1* | 5/2015 | Fujiwara | G03G 15/2064 399/329 |
| 2015/0227091 | A1* | 8/2015 | Ando | G03G 15/2046 399/33 |
| 2017/0363995 | A1 | 12/2017 | Takagi | |
| 2017/0364001 | A1 | 12/2017 | Takagi et al. | |
| 2017/0364005 | A1 | 12/2017 | Kikuchi et al. | |
| 2017/0367152 | A1 | 12/2017 | Takagi et al. | |
| 2019/0004458 | A1* | 1/2019 | Muramatsu | H02H 5/042 |
| 2020/0174408 | A1 | 6/2020 | Furuichi et al. | |
| 2020/0201214 | A1 | 6/2020 | Ogura et al. | |

FOREIGN PATENT DOCUMENTS

| | | | |
|---|---|---|---|
| JP | 2013235181 | A | 11/2013 |
| JP | 2016018127 | A | 2/2016 |
| JP | 2017009848 | A | 1/2017 |
| JP | 2017111253 | A | 6/2017 |

OTHER PUBLICATIONS

Notice of Reasons for Refusal mailed Jun. 7, 2022 in corresponding Japanese Patent Application No. 2019-021852, 14 pages.

* cited by examiner

HEATING DEVICE WITH THERMOMETERS AND THERMOSTATS ALTERNATELY ARRANGED ON A HEAT CONDUCTOR

CROSS-REFERENCE TO RELATED APPLICATIONS

This application is a continuation of U.S. patent application Ser. No. 18/332,772, filed on Jun. 12, 2023, which is a continuation of U.S. patent application Ser. No. 17/944,154, filed on Sep. 13, 2022, now U.S. Pat. No. 11,714,369, issued on Aug. 1, 2023, which is a continuation of U.S. patent application Ser. No. 17/562,867, filed on Dec. 27, 2021, now abandoned, which is a continuation of U.S. patent application Ser. No. 17/322,755, filed on May 17, 2021, now U.S. Pat. No. 11,237,505, issued on Feb. 1, 2022, which is a continuation of U.S. patent application Ser. No. 16/734,215, filed on Jan. 3, 2020, now U.S. Pat. No. 11,042,109, issued on Jun. 22, 2021, which is based upon and claims the benefit of priority from Japanese Patent Application No. 2019-021852, filed on Feb. 8, 2019, the entire contents of which are incorporated herein by reference.

FIELD

An embodiment of the present invention relates to a heating device and an image processing apparatus.

BACKGROUND

An image forming apparatus for forming an image on a sheet includes a heating apparatus for fixing a toner (i.e., recording agent) to the sheet. Heating temperature is required to be appropriately controlled in the heating apparatus.

DETAILED DESCRIPTION

In one embodiment, a heating device includes a substrate, one or more heating elements arranged along the substrate, a heat conductor contacting the substrate, a plurality of thermometers each configured to measure a temperature of the heat conductor, and a plurality of thermostats each configured to measure a temperature of the heat conductor and interrupt electrical power supplied to the heating elements. The thermometers and the thermostats are alternately arranged in a longitudinal direction of the substrate.

Hereinafter, as an example of an image processing apparatus and a heating apparatus, an image forming apparatus and a fixing unit will be described with reference to the drawings.

Figure 1:
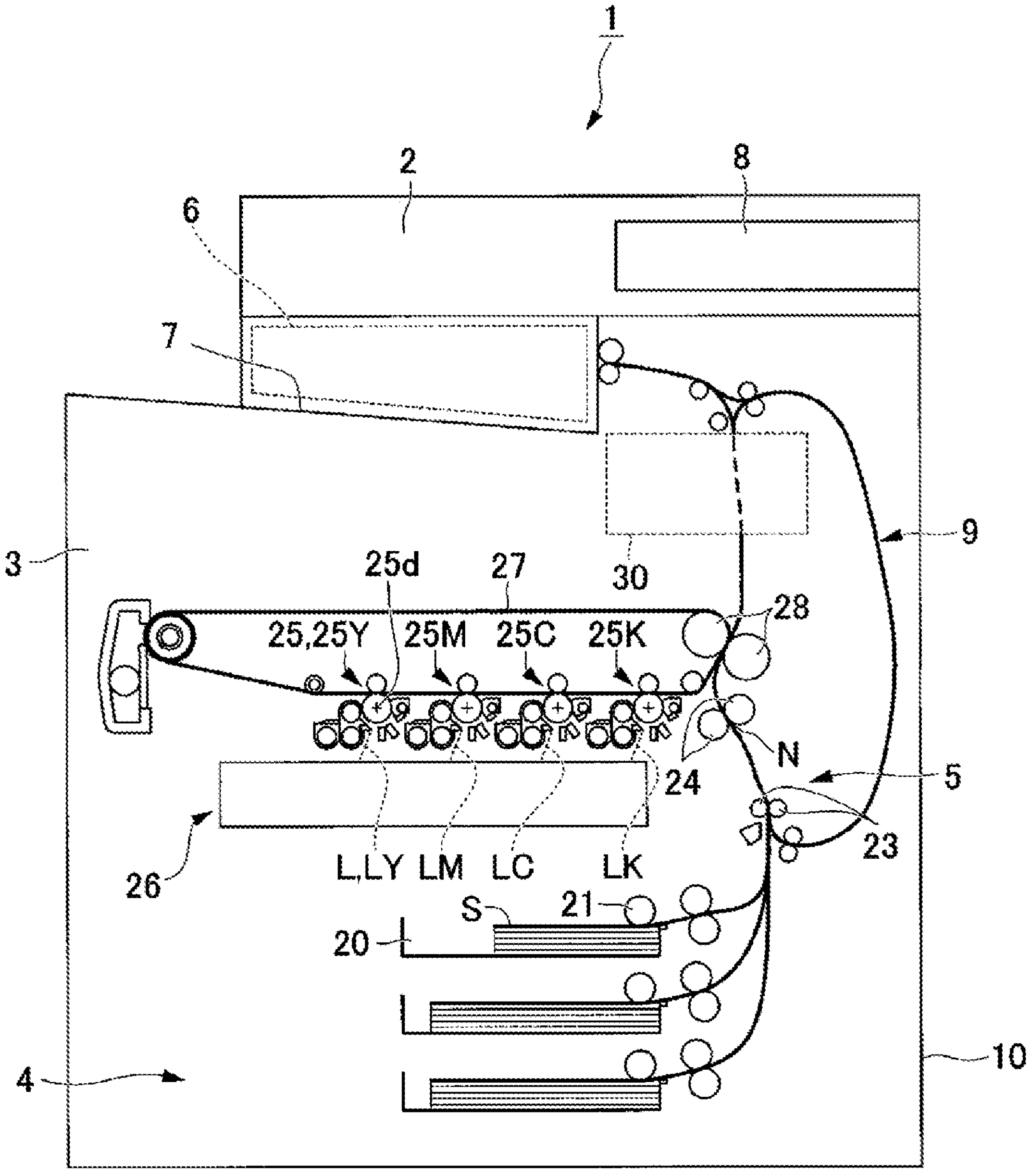
FIG. 1 is a schematic configuration diagram of an image forming apparatus according to one embodiment.

FIG. 1 is a schematic configuration diagram of an image forming apparatus according to one embodiment of the present invention. The image forming apparatus 1 performs processing for forming an image on a sheet of paper S. The image forming apparatus 1 includes a housing 10, a scanner unit 2, an image forming unit 3, a sheet supply unit 4, a forcing unit 5, a paper discharge tray 7, a reversing unit 9, a control panel 8, and a controller 6.

The housing 10 forms an outer contour of the image forming apparatus 1. The scanner unit 2 reads image information of an object to be copied as the light and dark of the light to generate an image signal. The scanner unit 2 outputs the generated image signal to the image forming unit 3. The image forming unit 3 forms an output image (hereinafter referred to as a toner image) by a recording agent such as toner on the basis of the image signal received from the scanner unit 2 or an image signal received from the outside. The image forming unit 3 transfers the toner image onto the surface of the sheet S. The image forming unit 3 heats and pressurizes the toner image on the surface of the sheet S to fix the toner image to the sheet S. The details of the image forming unit 3 will be described later.

The sheet supply unit 4 supplies the sheet S to the conveying unit 5 in accordance with the timing at which the image forming unit 3 forms the toner image. The sheet supply unit 4 includes a sheet storage unit 20 and a pickup roller 21. The sheet storage unit 20 accommodates the sheet S of a predetermined size and type. The pickup roller 21 takes out the sheets S one by one from the sheet storage unit 20. The pickup roller 21 supplies the taken-out sheet S to the conveying unit 5.

The conveying unit 5 conveys the sheet S supplied from the sheet supply unit 4 to the image forming unit 3. The conveying unit 5 includes a conveying roller 23 and a registration roller 24. The conveying roller 23 conveys the sheet S supplied from the pickup roller 21 to the registration roller 24. The conveying roller 23 presses the leading end of the sheet S in the conveying direction against the nip N of the registration roller 24. The registration roller 24 bends the sheet S in the nip N to thereby adjust the position of the leading edge of the sheet S in the conveying direction. The registration roller 24 conveys the sheet S in accordance with the timing at which the image forming unit 3 transfers the toner image to the sheet S.

The image forming unit 3 will be described. The image forming unit 3 includes a plurality of image forming units 25 (25Y, 25M, 25C, and 25K), a laser scanning unit 26, an intermediate transfer belt 27, a transfer unit 28, and a fixing unit 30. Each of the image forming units 25 includes a photosensitive drum 25*d*. Each of the image forming units 25 forms a toner image corresponding to the image signal from the scanner unit 2 or an external device on the photosensitive drum 25*d*. The plurality of image forming units 25Y, 25M, 25C and 25K form toner images of yellow, magenta, cyan and black toners, respectively.

A charger, a developing device, and the like are disposed around the photosensitive drum 25*d* of each of the image forming units 25Y, 25M, 25C, and 25K. The charging device charges the surface of the photosensitive drum 25*d*. The developing device of each of the image forming units 25Y, 25M, 25C, and 25K contains developer containing one of yellow, magenta, cyan and black toners. The developing device develops the electrostatic latent image on the photosensitive drum 25*d*. As a result, a toner image is formed by the toner of each color on the corresponding photosensitive drum 25*d*.

The laser scanning unit 26 scans the charged photosensitive drum 25*d* with the laser beam L to expose the photosensitive drum 25*d*. The laser scanning unit 26 exposes the photosensitive drums 25*d* of the image forming units 25Y, 25M, 25C and 25K of the respective colors with the respective laser beams LY, LM, LC and LK. In this manner, the laser scanning unit 26 forms an electrostatic latent image on the photosensitive drum 25*d*.

The toner image on the surface of the photosensitive drum 25*d* is primarily transferred onto the intermediate transfer belt 27. The transfer portion 28 transfers the toner image primarily transferred onto the intermediate transfer belt 27 onto the surface of the sheet S at the secondary transfer position. The fixing unit 30 heats and pressurizes the toner image transferred to the sheet S to fix the toner image on the sheet S. The details of the fixing unit 30 will be described later.

The reversing unit 9 reverses the sheet S to form an image on the back surface of the sheet S. The reversing unit 9 reverses the sheet S discharged from the fixing unit 30 by switch-back. The reversing unit 9 conveys the reversed sheet S toward the registration roller 24. The sheet discharge tray 7 supports the sheet S that has been ejected with an image formed thereon. The control panel 8 is a part of an input unit for inputting information for an operator to operate the image forming apparatus 1. The control panel 8 includes a touch panel and various hardware keys. The controller 6 controls each of the components installed in the image forming apparatus 1. The details of the controller 6 will be described later.

Figure 2:
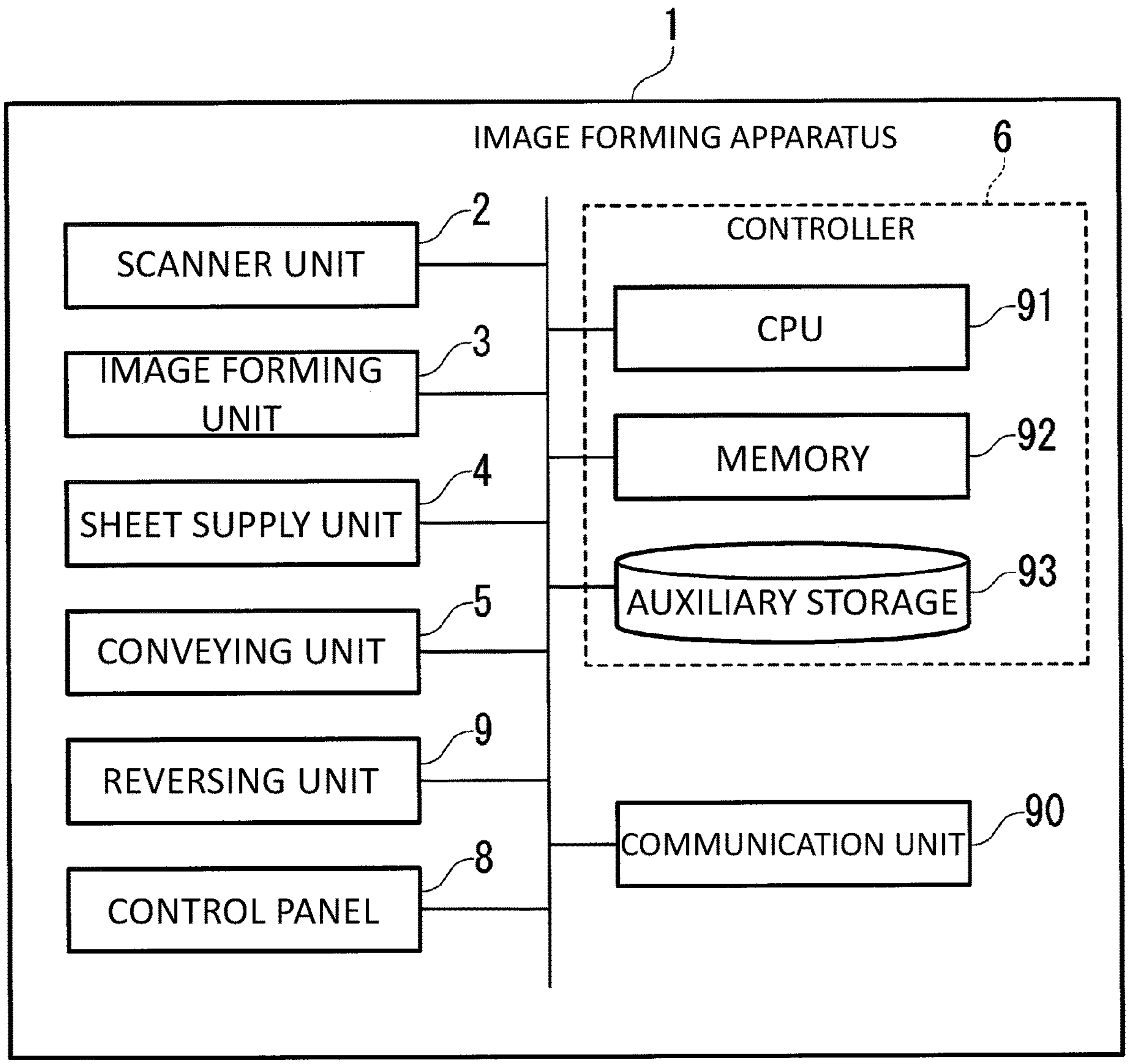
FIG. 2 is a hardware configuration diagram of the image forming apparatus.

FIG. 2 is a hardware configuration diagram of an image forming apparatus according to an embodiment of the present invention. The image forming apparatus 1 includes a CPU (Central Processing Unit) 91, a memory 92, and an auxiliary storage device 93 connected to each other via a bus, and executes a program. As described above, the image forming apparatus 1 includes the scanner unit 2, the image forming unit 3, the sheet supply unit 4, the forcing unit 5, the reversing unit 9, the control panel 8, and a communication unit 90.

The CPU 91 is a component of the controller 6 and executes programs stored in the memory 92 and the auxiliary storage device 93 to achieve each function of the image forming apparatus 1. The auxiliary storage device 93 is a storage device such as a magnetic hard disk device or a semiconductor storage device. The auxiliary storage device 93 stores information. The communication unit 90 includes a communication interface for communicating with an external device via a network.

Figure 3:
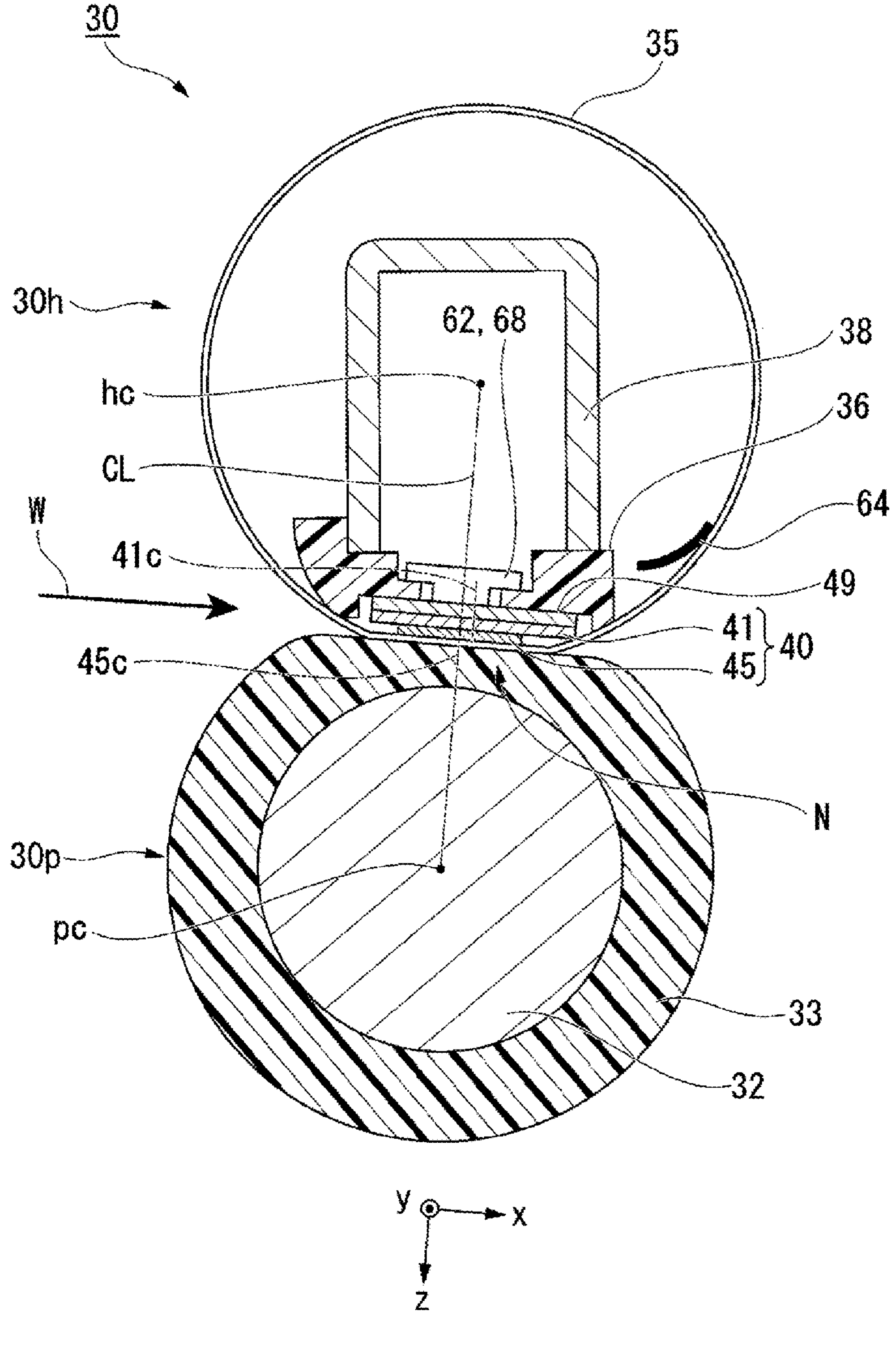
FIG. 3 is a front sectional view of a fixing unit according to one embodiment.

The fixing unit 30 will be described in detail. FIG. 3 is a front sectional view of the fixing unit 30. The fixing unit 30 includes a pressing roller 30*p* and a film unit 30*h*.

The pressing roller 30*p* forms a nip N with the film unit 30*h*. The pressing roller 30*p* pressurizes the toner image on the sheet S that has entered into the nip N. The pressing roller 30*p* rotates and conveys the sheet S. The pressure roller 30*p* includes a core metal 32, an elastic layer 33, and a release layer (not shown).

The core metal 32 is formed in a cylindrical shape by a metal material such as stainless steel or the like. Both end portions in the axial direction of the core metal 32 are supported to be rotatable. The core metal 32 is driven to rotate by a motor (not shown). The core metal 32 comes into contact with a cam member (not shown). The cam member is rotated to move the core metal 32 toward and away from the film unit 30*h*.

The elastic layer 33 is formed of an elastic material such as silicone rubber. The elastic layer 33 is formed to have a constant thickness on the outer peripheral surface of the core metal 32. The release layer (not shown) is formed of a resin material such as PFA (tetrafluoroethylene perfluoroalkyl vinyl ether copolymer). The release layer is formed on the outer peripheral surface of the elastic layer 33. It is preferable that the hardness of the outer circumferential surface of the pressure roller 30*p* is between 40° and 70° under a load of 9.8N by an ASKER-C hardness meter. As a result, the area of the nip N and the durability of the pressing roller 30*p* are secured.

The pressing roller 30*p* is able to move toward and away from the film unit 30*h* by the rotation of the cam member. When the pressing roller 30*p* is brought close to the film unit 30*h* and pressed by a pressing spring, a nip N is formed. On the other hand, when the sheet S is jammed in the fixing unit 30, the sheet S can be removed by separating the pressure roller 30*p* from the film unit 30*h*. In addition, in a state in which the cylindrical film 35 is stopped to rotate, such as in a sleep state, the pressure roller 30*p* is moved away from the film unit 30*h*, thereby preventing plastic deformation of the cylindrical film 35.

The pressure roller 30*p* is rotated by a motor. When the pressing roller 30*p* rotates in a state where the nip N is formed, the cylindrical film 35 of the film unit 30*h* is driven to rotate. The pressing roller 30*p* conveys the sheet S in the conveying direction W by rotating the sheet S in a state in which the sheet S is placed in the nip N.

The film unit 30*h* heats the toner image of the sheet S that has entered the nip N. The film unit 30*h* includes the cylindrical film 35, a heater unit 40, a heat conductor 49, a support member 36, a stay 38, a heater thermometer 62, a thermostat 68, and a film thermometer 64.

The cylindrical film 35 is formed in a cylindrical shape. The cylindrical film 35 has a base layer, an elastic layer, and a release layer in this order from the inner peripheral side. The base layer is formed in a cylindrical shape by a material such as nickel (Ni) or the like. The elastic layer is laminated and arranged on the outer peripheral surface of the base layer. The elastic layer is formed of an elastic material such as silicone rubber. The release layer is laminated and arranged on the outer peripheral surface of the elastic layer. The release layer is formed of a material such as a PFA resin.

Figure 4:
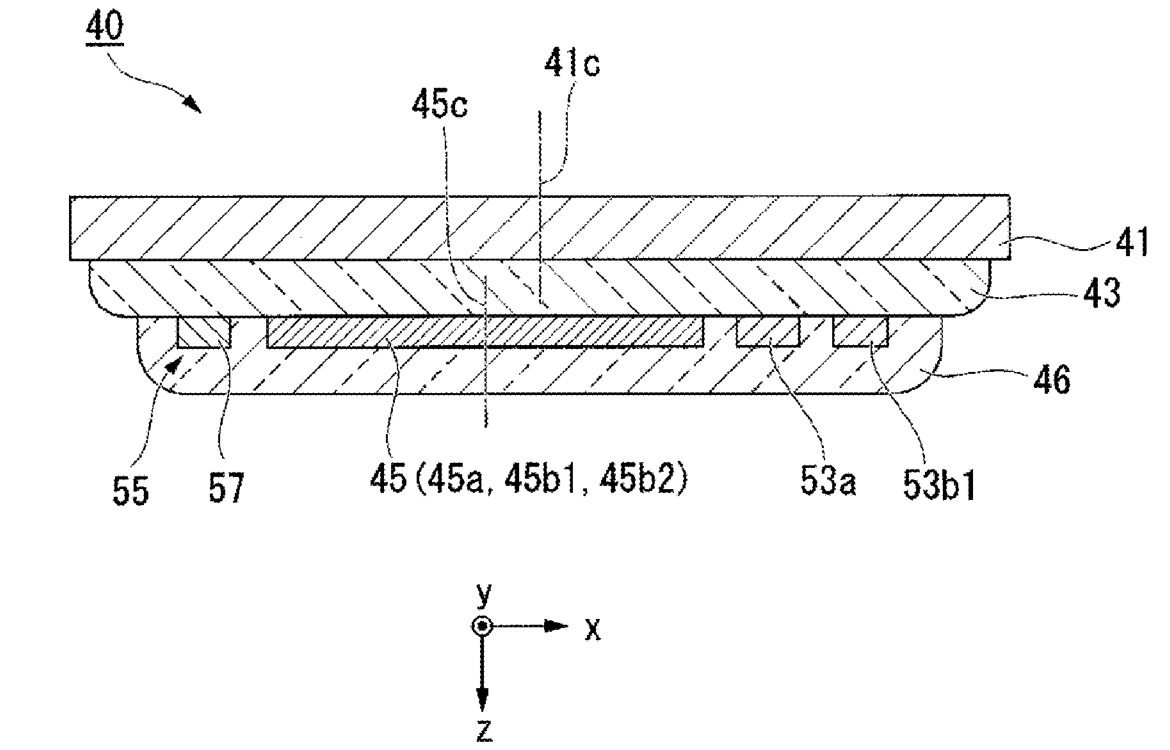
FIG. 4 is a front sectional view of a heater unit of the fixing unit.
Figure 5:
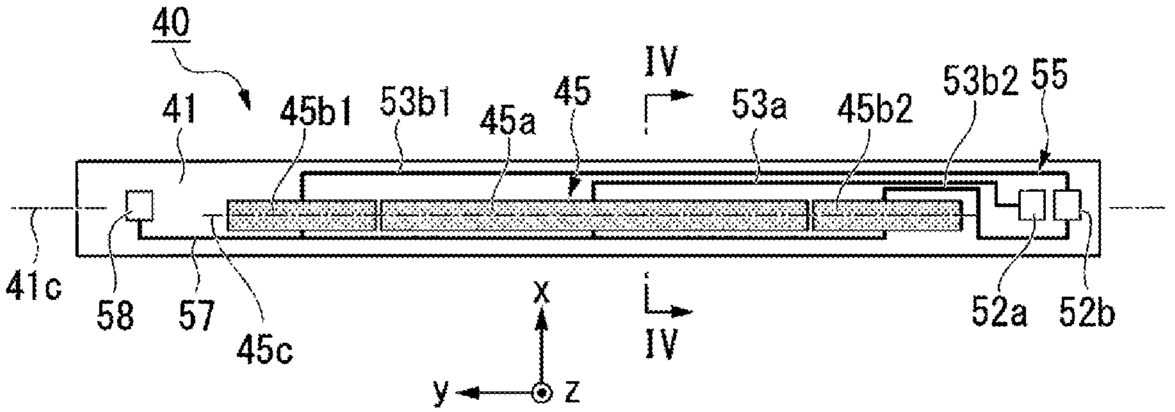
FIG. 5 is a bottom view of the heater unit.

FIG. 4 is a front sectional view of the heater unit 40 taken along the line IV-IV in FIG. 5. FIG. 5 is a bottom view of the heater unit 40 (i.e., viewed from the +z direction). The heater unit 40 includes a substrate 41, a heating element set 45, and a wiring set 55.

The substrate 41 is made of a metal material such as stainless steel, a ceramic material such as aluminum nitride, or the like. The substrate 41 is formed in an elongated rectangular plate shape. The substrate 41 is disposed radially inward of the cylindrical film 35. In the substrate 41, the longitudinal direction corresponds to the axial direction of the cylindrical film 35.

In the present application, the x direction, the y direction, and the z direction are defined as follows. The y direction is the longitudinal direction of the substrate 41. As will be described later, the +y direction is a direction from a central heating element 45*a* to a first end heating element 45*b*1. The x direction is the short direction of the substrate 41, and the +x direction is the transport direction (i.e., downstream side) of the sheet S. The z direction is the normal direction of the substrate 41, and the +z direction is the direction in which the heating element set 45 is arranged with respect to the substrate 41. An insulating layer 43 is formed on the surface of the substrate 41 in the +z direction by a glass material or the like.

The heating element set 45 is arranged on the substrate 41. The heating element set 45 is formed on the surface of the insulating layer 43 in the +z direction, as shown in FIG. 4. The heating element set 45 is formed of a silver-palladium alloy or the like. The heating element set 45 has a rectangular shape in which the y direction is the longitudinal direction and the x direction is the short direction.

As shown in FIG. 5, the heating element set 45 includes a plurality of heating elements **45*b*1, 45*a* and 45*b*2 provided along the y direction. The heating element set 45 includes a first end heating element 45*b*1, a central heating element 45*a*, and a second end heating element 45*b*2 arranged side by side in the y direction. The central heating element 45*a* is disposed in the central portion of the heating element set 45 in the y direction. The central heating element 45*a* may be composed of a combination of a plurality of small heat-generating elements arranged side by side in the y direction. The first end heating element 45*b*1 is located at the +y direction end of central heating element 45*a* and at the +y direction end of heating element set 45. The second end heating element 45*b*2 is located in the −y direction of the central heating element 45*a* and at the end of the heating element set 45 in the −y direction. The boundary between the central heating element 45*a* and the first end heating element 45*b*1 may be arranged parallel to the x direction, and may be arranged to intersect with the x direction. The same applies to the boundary line between the central heating element 45*a* and the second end heating element 45*b*2**.

The heating element set 45 generates heat by energization. The electric resistance value of the central heating element **45*a* is smaller than the electric resistance value of the first end heating element 45*b*1 and the second end heating element 45*b*2**.

The sheet S having a small width in the y direction passes through the central portion in the y direction of the fixing unit 30. In this case, the controller 6 causes only the central heating element **45*a* to generate heat. On the other hand, in the case of the sheet S having a large width in the y direction, the controller 6 generates heat in the entirety of the heating element set 45. Therefore, the central heating element 45*a* and the first end heating element 45*b*1 and the second end heating element 45*b*2 are controlled in heat generation independently of each other. Also, the first end heating element 45*b*1 and the second end heating element 45*b*2** are similarly controlled in heat generation.

The wiring set 55 is made of a metal material such as silver. The wiring set 55 includes a central contact **52*a*, a central portion wiring 53*a*, an end contact 52*b*, a first end wiring 53*b*1, a second end wiring 53*b*2, a common contact 58, and a common wiring 57**.

The central contact **52*a* is arranged on the −y direction side of the heating element set 45. The central portion wiring 53*a* is arranged on the +x direction side of the heating element set 45. The central portion wiring 53*a* connects the side in the +x direction of the central heating element 45*a* and the central portion contact 52*a***.

The end contact **52*b* is arranged on the −y direction side of the central contact 52*a*. The first end wiring 53*b*1 extends along the side in the +x direction of the heating element set 45 and on the +x direction side of the central portion wiring 53*a*. The first end wiring 53*b*1 connects the end of the first end heating element 45*b*1 in the +x direction and the end of the end contact 52*b* in the +x direction. The second end wiring 53*b*2 extends along the side in the +x direction of the heating element set 45 and on the −x direction side of the central portion wiring 53*a*. The second end wiring 53*b*2 connects the end of the second end heating element 45*b*2 in the +x direction and the end of the end contact 52*b*** in the −x direction.

The common contact 58 is arranged at the end in the ty direction of the heating element set 45. The common wiring 57 extends along the side in the −x direction of the heating element set 45. The common wiring 57 connects the end sides in the −x direction of the central heating element **45*a*, the first end heating element 45*b*1 and the second end heating element 45*b*2, and the common contact 58**.

In this manner, the second end wiring **53*b*2, the central portion wiring 53*a* and the first end portion wiring 53*b*1 extend along the side in the +x direction of the heating element set 45. In contrast, only the common wiring 57 extends along the side in the −x direction of the heating element set 45. Therefore, the center 45*c* in the x direction of the heating element set 45 is arranged on the −x direction side with respect to the center 41*c* in the x direction of the substrate 41**.

As shown in FIG. 3, a straight line CL connecting the center pc of the pressure roller **30*p* and the center hc of the film unit 30*h* is defined. The center 41*c* in the x direction of the substrate 41 is arranged in the +x direction from the straight line CL. Thus, the substrate 41 extends in the +x direction of the nip N, so that the sheet S that has passed through the nip N is easily peeled off from the film unit 30*h***.

The center **45*c* of the heating element set 45 in the x direction is disposed on the straight line CL. The heating element set 45** is contained entirely within the region of the nip N and is located at the center of the nip N. Thus, the heat distribution of the nip N becomes uniform, and the sheet S passing through the nip Nis uniformly heated.

As shown in FIG. 4, the heating element set 45 and the wiring set 55 are formed on the surface of the insulating layer 43 in the +z direction. A protective layer 46 is formed of a glass material or the like so as to cover the heating element set 45 and the wiring set 55. The protective layer 46 improves the sliding property between the heater unit 40 and the cylindrical film 35.

As shown in FIG. 3, the heater unit 40 is disposed inside the cylindrical film 35. A lubricant (not shown) is applied to the inner peripheral surface of the cylindrical film 35. The heater unit 40 is brought into contact with the inner peripheral surface of the cylindrical film 35 through the lubricant. When the heater unit 40 generates heat, the viscosity of the lubricant is lowered. Thus, the sliding property between the heater unit 40 and the cylindrical film 35 is secured.

The heat conductor 49 is formed of a metal material having a high thermal conductivity, such as copper. The outer shape of the heat conductor 49 is equivalent to the outer shape of the substrate 41 of the heater unit 40. The heat conductor 49 is disposed in contact with the surface of the heater unit 40 in the −z direction.

The support member 36 is made of a resin material such as a liquid crystal polymer. The support member 36 is disposed so as to cover the side in the −z direction of the heater unit 40 and the both sides in the x direction of the heater unit 40. The support member 36 supports the heater unit 40 via a heat conductor 49. Rounded chamfering is formed at both end portions in the x direction of the support member 36. The support member 36 supports the inner peripheral surface of the cylindrical film 35 at both end portions in the x direction of the heater unit 40.

When the sheet S passing through the fixing unit 30 is heated, a temperature distribution is generated in the heater unit 40 in accordance with the size of the sheet S. When the heater unit 40 becomes locally high temperature, there is a possibility that the heat resistance temperature of the support member 36 made of a resin material exceeds the heat resistance temperature. The heat conductor 49 averages the temperature distribution of the heater unit 40. As a result, heat resistance of the support member 36 is ensured.

The stay 38 is formed of a steel sheet material or the like. A cross section perpendicular to the y direction of the stay 38 is formed in a U shape. The stay 38 is mounted on the surface in the −z direction of the support member 36 so as to block the opening of the U shape by the support member 36. The stay 38 extends in the y direction. Both end portions of the stay 38 in the y direction in the y direction are fixed to the housing of the image forming apparatus 1. As a result, the film unit 30*h* is supported by the image forming apparatus 1. The stay 38 improves the bending rigidity of the film unit 30*h*. A flange (not shown) for restricting the movement of the cylindrical film 35 in the y direction is mounted in the vicinity of both end portions in the y direction of the stay 38.

The heater thermometer 62 is arranged in the −z direction of the heater unit 40 with the heat conductor 49 interposed therebetween. For example, the heater thermometer 62 is mounted on and supported by a surface in the −z direction of the support member 36. The temperature sensitive element of the heater thermometer 62 contacts the heat conductor 49 through a hole passing through the support member 36 in the z direction. The heater thermometer 62 measures the temperature of the heater unit 40 via the heat conductor 49.

The thermostat 68 is arranged similarly to the heater thermometer 62. The thermostat 68 is incorporated into an electrical circuit, which will be described later. When the temperature of the heater unit 40 detected through the heat conductor 49 exceeds a predetermined temperature, the thermostat 68 cuts off the power supply to the heating element set 45.

Figure 6:
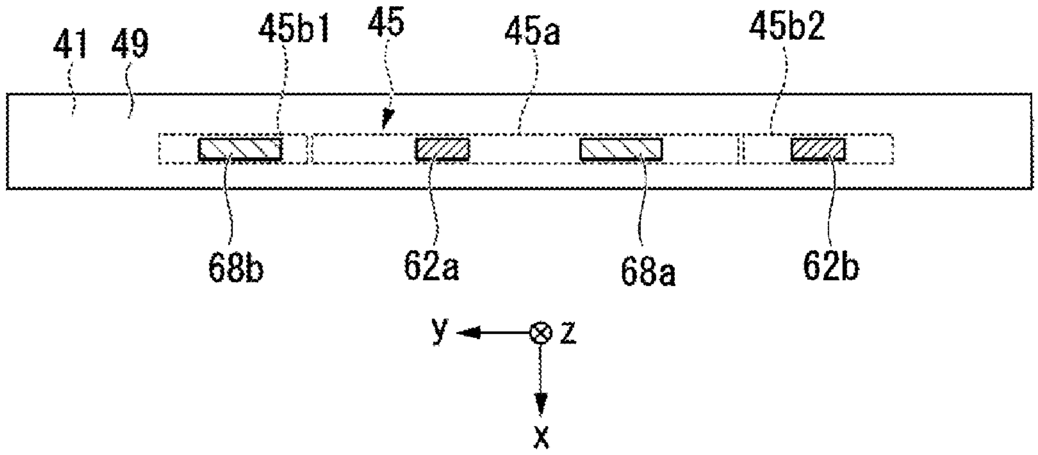
FIG. 6 is a plan view of a heater thermometer and a thermostat.

FIG. 6 is a top view of the heater thermometer and thermostat (i.e., viewed from the −z direction). In FIG. 6, the description of the supporting member 36 is omitted. The following description of the arrangement of the heater thermometer, thermostat and film thermometer is used to describe the arrangement of the respective temperature sensitive elements.

A plurality of heater thermometers 62 (62*a*, 62*b*) are arranged in the heating element set 45 side by side along the y direction. The plurality of heater thermometers 62 are disposed at the center of the heating element set 45 in the x direction. That is, when viewed from the z direction, the plurality of heater thermometers 62 and the heating element set 45 overlap at least partially. The plurality of thermostats 68 (68*a*, 68*b*) are also arranged in the same manner as the plurality of heater thermometers 62 described above.

A plurality of heater thermometers 62 include a central heater thermometer 62*a* and an end heater thermometer 62*b*.

The central heater thermometer 62*a* measures the temperature of the central heating element 45*a*. The central heater thermometer 62*a* is positioned within the central heating element 45*a*. That is, when viewed from the z direction, the central heater thermometer 62*a* and the central heating element 45*a* overlap each other.

The end heater thermometer 62*b* measures the temperature of the second end heating element 45*b*2. As described above, the first end heating element 45*b*1 and the second end heating element 45*b*2 are similarly controlled in heat generation. Therefore, the temperature of the first end heating element 45*b*1 and the temperature of the second end heating element 45*b*2 are equal to each other. The end heater thermometer 62*b* is located within a range of second end heating element 45*b*2. That is, the end heater thermometer 62*b* and the second end heating element 45*b*2 overlap each other when viewed from the direction z.

The plurality of thermostats 68 include a central thermostat 68*a* and an end thermostat 68*b*.

The central thermostat 68*a* interrupts the energization of the heating element set 45 when the temperature of the central heating element 45*a* exceeds the predetermined temperature. The central thermostat 68*a* is positioned within the range of the central heating element 45*a*. That is, when viewed in the z direction, the central thermostat 68*a* and the central heating element 45*a* overlap each other.

The end thermostat 68*b* interrupts energization of the heating element set 45 when the temperature of the first end heating element 45*b*1 exceeds a predetermined temperature. As described above, the first end heating element 45*b*1 and the second end heating element 45*b*2 are similarly controlled in heat generation. Therefore, the temperature of the first end heating element 45*b*1 and the temperature of the second end heating element 45*b*2 are equal to each other. The end thermostat 68*b* is located within a range of the first end heating element 45*b*1. That is, when viewed from the z direction, the end thermostat 68*b* and the first end heating element 45*b*1 overlap each other.

As described above, the central heater thermometer 62*a* and the central thermostat thermometer 68*a* are disposed on the central heating element 45*a* so as to measure the temperature of the central heating element 45*a*. When the temperature of the central heating element 45*a* exceeds the predetermined temperature, the power supply to the heating element set 45 is interrupted. On the other hand, the end heater thermometer 62*b* and the end thermostat 68*b* are disposed on the first end heating element 45*b*1 and the second end heating element 45*b*2. As a result, the temperatures of the first end heating element 45*b*1 and the second end heating element 45*b*2 are measured. When the temperature of the first end heating element 45*b*1 and the second end heating element 45*b*2 exceeds a predetermined temperature, the power supply to the heating element set 45 is interrupted.

The plurality of heaters 62 and the plurality of thermostats 68 are alternately arranged along the y direction. As described above, the first end heating element 45*b*1 is arranged on the +y direction side of the central heating element 45*a*. Within the first end heating element 45*b*1, the end thermostat 68*b* is disposed. The central heater thermometer 62*a* is arranged on the ty direction side with respect to the central of the central heating element 45*a*. The central thermostat 68*a* is arranged on the −y direction side with respect to the central of central heating element 45*a*. As described above, the second end heating element 45*b*2 is arranged on the −y direction side of the central heating element 45*a*. Within the second end heating element 45*b*2, the end heater thermometer 62*b* is located. Thus, the end thermostat 68*b*, the central heater thermometer 62*a*, the central thermostat 68*a* and the end heater thermometer 62*b* are arranged in this order along the −y direction.

In general, thermostat 68 utilizes a bimetal curve deformation with temperature changes to connect and disconnect the electrical circuit. The thermostat is formed to be elongated in conformity to the shape of the bimetal. Terminals extend outward from both end portions in the longitudinal direction of the thermostat 68. Each terminal is connected to a connector of external wiring. Therefore, it is necessary to secure a space outside the thermostat 68 in the longitudinal direction. Since there is no space at both ends in the x direction of the fixing unit 30, the longitudinal direction of the thermostat 68 is arranged along the y direction. In this case, when a plurality of thermostats 68 are arranged adjacent to each other in the y direction, it becomes difficult to secure a connection space of the external wiring.

As described above, the plurality of heaters 62 and the plurality of thermostats 68 are alternately arranged along the y direction. Thus, a heater thermometer 62 is disposed adjacent to each thermostat 68 in the y direction. Therefore, it is possible to secure a space for connecting external wiring to the thermostat 68. In addition, the degree of freedom in the layout in the y direction of the thermostat 68 and the heater thermometer 62 is increased. This allows the thermostat 68 and heater thermometer 62 to be positioned at an optimal position to control the temperature of the fixing unit 30. Further, it is easy to separate the alternating current wiring connected to the plurality of thermostats 68 from the direct current wiring connected to the plurality of heater thermometers 62. As a result, noise in the electric circuit is suppressed.

As shown in FIG. 3, the film thermometer 64 is disposed inside the cylindrical film 35 and on the +x direction side of the heater unit 40. The film thermometer 64 contacts the inner peripheral surface of the cylindrical film 35 to measure the temperature of the cylindrical film 35.

Figure 7:
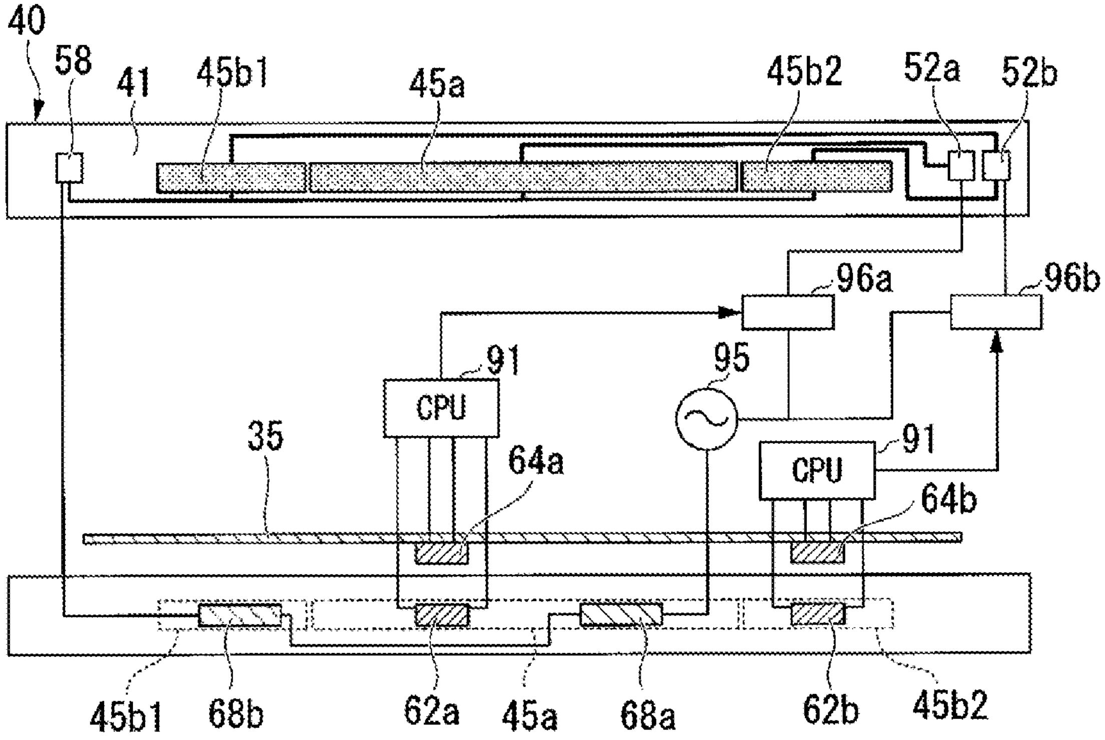
FIG. 7 is an electric circuit diagram of the fixing unit.

FIG. 7 is an electric circuit diagram of the fixing unit according to one embodiment. In FIG. 7, the bottom view of the heater unit 40 shown in FIG. 5 is located at the top of FIG. 7, and the plan view of the substrate 41 shown in FIG. 6 is arranged at the bottom of FIG. 7. FIG. 7 also shows a plurality of film thermometers 64 along with a cross section of the cylindrical film 35. The plurality of film thermometers 64 includes a central film thermometer 64*a* and an end film thermometer 64*b*.

The central film thermometer 64*a* comes into contact with the central portion of the cylindrical film 35 in the y direction. The central film thermometer 64*a* contacts the cylindrical film 35 within the range in the y-direction of the central heating element 45*a*. The central film thermometer 64*a* measures the temperature of the central portion in the y direction of the cylindrical film 35.

The end film thermometer 64*b* contacts the end of cylindrical film 35 in the −y direction. The end film thermometer 64*b* contacts the cylindrical film 35 within the range in the y-direction of the second end heating element 45*b*2. The end film thermometer 64*b* measures the temperature at the end of the cylindrical film 35 in the −y direction. As described above, the first end heating element 45*b*1 and the second end heating element 45*b*2 are similarly controlled in heat generation. Therefore, the temperature at the end portion in the −y direction of the cylindrical film 35 and the temperature at the end portion in the +y direction are identical.

A power supply 95 is electrically connected to the central contact point 52*a* via a central triac 96*a*. The power supply 95 is electrically connected to the end contact 52*b* via an end triac 96*b*. The CPU 91 controls ON/OFF of the central triac 96*a* and the end triac 96*b* independently of each other. When the CPU 91 turns on the central triac 96*a*, power is supplied to the central heating element 45*a* from the power supply 95. As a result, the central heating element 45*a* generates heat. When the CPU 91 turns on the end triac 96*b*, the power is supplied from the power supply 95 to the first end heating element 45*b*1 and the second end heating element 45*b*2. As a result, the first end heating element 45*b*1 and the second end heating element 45*b*2 generate heat. As described above, the central heating element 45*a* and the first end heating element 45*b*1 and the second end heating element 45*b*2 are controlled in heat generation independently from each other. The central heating element 45*a*, the first end heating element 45*b*1 and the second end heating element 45*b*2 are connected in parallel with respect to the power supply 95.

The power supply 95 is electrically connected to the common contact 58 via the central thermostat 68*a* and the end thermostat 68*b*. The central thermostat 68*a* and the end thermostat 68*b* are connected in series. When the temperature of the central heating element 45*a* rises abnormally, the detected temperature of the central thermostat 68*a* exceeds the predetermined temperature. At this time, the central thermostat 68*a* shuts off the power supply from the power supply 95 to the heating element set 45.

When the temperature of the first end heating element 45*b*1 rises abnormally, the detected temperature of the end thermostat 68*b* exceeds a predetermined temperature. At this time, the end thermostat 68*b* shuts off the power supply from the power supply 95 to the heating element set 45. As described above, the first end heating element 45*b*1 and the second end heating element 45*b*2 are similarly controlled in heat generation. Therefore, when the temperature of the second end heating element 45*b*2 rises abnormally, the temperature of the first end heating element 45*b*1 also increases. Accordingly, in the case where the temperature of the second end heating element 45*b*2 abnormally rises, the end thermostat 68*b* also shuts off the power supplied from the power supply 95 to the whole of heating element set 45.

The CPU 91 of the controller 6 acquires the temperature of the central heating element 45*a* from the central heater thermometer 62*a*. The CPU 91 acquires the temperature of the second end heating element 45*b*2 from the end heater thermometer 62*b*. The temperature of the second end heating element 45*b*2 is equal to the temperature of the first end heating element 45*b*1. At the time of starting the fixing unit 30, the CPU 91 controls the heater thermometer 62 to measure the temperature of the heating element set 45. When the temperature of the heating element set 45 is lower than the predetermined temperature, the CPU 91 causes the heating element set 45 to generate heat only for a short time. Thereafter, the CPU 91 controls the pressure roller 30*p* to start the rotation. The heat generated by the heating element set 45 lowers the viscosity of lubricant applied to the inner peripheral surface of the cylindrical film 35. Thus, the sliding property between the heater unit 40 and the cylindrical film 35 at the start of the rotation of the pressure roller 30*p* is ensured.

The CPU 91 controls the central film thermometer 64*a* to measure the temperature of the central portion in the y direction of the cylindrical film 35. The CPU 91 controls the end film thermometer 64*b* to measure the temperature at the end portion in the −y direction of the cylindrical film. The temperature of the end of the cylindrical film 35 in the −y direction is equal to the temperature of the end of the cylindrical film 35 in the +y direction. The temperatures of the central portion and the end portion in the y direction of the cylindrical film 35 are measured during the operation of the fixing unit 30. The CPU 91 controls the phase or wave number of electric power supplied to the heating element set 45 by the central triac 96*a* and the end triac 96*b*. The CPU 91 controls the energization to the central heating element 45*a* based on the temperature measurement result at the central portion in the y direction of the cylindrical film 35. The CPU 91 controls the energization to the first end heating element 45*b*1 and the second end heating element 45*b*2 based on the temperature measurement result at the end portion in the y direction of the cylindrical film 35.

As described above, the fixing unit 30 of the embodiment includes the cylindrical film 35, the heating element set 45, the plurality of heater thermometers 62, and the plurality of thermostats 68. The heating element set 45 is disposed inside the cylindrical film 35, and the axial direction of the cylindrical film 35 is taken as the longitudinal direction of the cylindrical film 35. The plurality of heaters 62 and the plurality of thermostats 68 are alternately arranged along the longitudinal direction of the heating element set 45 within the heating element set 45.

The plurality of heaters 62 and the plurality of thermostats 68 are alternately arranged along the longitudinal direction of the cylindrical film 35. Therefore, it is possible to secure a space for connecting external wiring to the thermostat 68 at both sides in the Y direction of the substrate 41. In addition, the degree of freedom in the layout on the substrate 41 in the y direction of the thermostat 68 and the heater thermometer 62 is increased. Thus, the thermostat 68 and the heater thermometer 62 are arranged at an optimal position to properly control the heating temperature.

The fixing unit 30 has the substrate 41. The substrate 41 is disposed inside the cylindrical film 35, and the axial direction of the cylindrical film 35 corresponds to the longitudinal direction of the substrate 41. The heating element set 45 is disposed on the substrate 41, and the short-side direction of the substrate 41 is defined as the short-side direction of the heating element set 45. The center in the lateral direction of the heating element set 45 is disposed at a position different from the center in the short-side direction of the substrate 41. In this case, a plurality of wirings can be arranged on one side in the lateral direction of the heating element set 45. As a result, heat generation of a plurality of heating elements included in the heating element set 45 can be controlled independently of each other.

The plurality of heaters 62 and the plurality of thermostats 68 are disposed at the center in the short-side direction of the heating element set 45. Thus, the plurality of heaters 62 and the plurality of thermostats 68 can accurately measure or detect the temperature of the heating element set 45.

The heating element set 45 includes the central heating element 45*a* and the first end heating element 45*b*1 and the second end heating element 45*b*2. The central heating element 45*a* is arranged at the center of the substrate 41 in the longitudinal direction. The first end heating element 45*b*1 and the second end heating element 45*b*2 are disposed at both ends in the longitudinal direction of the substrate 41, and heat generation is controlled independently of the central heating element 45*a*. The first end heating element 45*b*1 and the second end heating element 45*b*2 are similarly controlled in heat generation.

When the sheet S having a small width in the y direction is heated, only the central heating element 45*a* is caused to generate heat. As a result, rise in the temperature at the end portion of the cylindrical film 35 in the y direction is suppressed. When the sheet S having a large width in the y direction is heated, the first end heating element 45*b*1 and the second end heating element 45*b*2 are caused to generate heat in addition to the central heating element 45*a*. At this time, the first end heating element 45*b*1 and the second end heating element 45*b*2 generate heat in the same manner. Therefore, it is possible to uniformly heat the sheet S having a large width in the y-direction direction. As described above, the heating temperature can be appropriately controlled.

The plurality of heater thermometers 62 include the central heater thermometer 62*a* and the end heater thermometer 62*b*. The plurality of thermostats 68 include the central thermostat 68*a* and the end thermostat 68*b*. The central heater thermometer 62*a* and the central thermostat 68*a* are positioned within the central heating element 45*a*. The end thermostat 68*b* is located within a range of the first end heating element 45*b*1. The end heater thermometer 62*b* is located within a range of the second end heating element 45*b*2.

The central heater thermometer 62*a* measures the temperature of the central heating element 45*a*. When the temperature of the central heating element 45*a* measured by the central thermostat 68*a* exceeds the predetermined temperature, the power supply to the heating element set 45 is interrupted.

As described above, the first end heating element 45*b*1 and the second end heating element 45*b*2 are similarly controlled in heat generation. Therefore, the temperature of the first end heating element 45*b*1 and the temperature of the second end heating element 45*b*2 are equal to each other. The end heater thermometer 62*b* measures the temperature of the second end heating element 45*b*2. When the temperature of the first end heating element 45*b*2 exceeds the predetermined temperature by the end thermostat 68*b*, the power supply to the heating element set 45 is interrupted.

As a result, the temperature of all heating elements included in the heating element set 45 is measured. When the temperature of any of the heating elements included in the heating element set 45 exceeds the predetermined temperature, the energization of the heating element set 45 is interrupted. Therefore, it is possible to appropriately control the heating temperature.

The image forming apparatus 1 of the embodiment comprises the fixing unit 30 as described above. The fixing unit 30 is capable of appropriately controlling the heating temperature. Accordingly, the image forming apparatus 1 can improve image quality.

The heating element set 45 of the aforementioned embodiments includes three heating elements (i.e., the central heating element 45*a*, the first end heating element 45*b*1, and the second end heating element 45*b*2). In contrast, the number of heating elements included in the heating element set 45 may be one or two or equal to or more than 4. The heater thermometer 62 of the aforementioned embodiments includes two heater thermometers (i.e., the central heater thermometer 62*a* and the end heater thermometer 62*b*). In contrast, the number of heater thermometers 62 may be equal to or more than 3. The plurality of thermostats 68 of the embodiment include two thermostats (i.e., the central thermostat 68*a* and the end thermostat 68*b*). In contrast, the number of the plurality of thermostats 68 may be equal to or more than three.

In the aforementioned embodiments, the image forming apparatus 1 and the fixing unit 30 are described as examples of an image processing apparatus and a heating apparatus. Another example of the image processing apparatus is a decoloring apparatus having a decoloring unit. The decoloring apparatus performs a process of decoloring (i.e., erasing) an image formed on a sheet by a decolorable toner. The decoloring unit heats the decolorable toner image formed on the sheet passing through the nip to decolorize the toner image.

According to at least one embodiment as described above, the plurality of heaters 62 and the plurality of thermostats 68 are alternately arranged along the longitudinal direction of the heating element set 45. As a result, the heating temperature can be appropriately controlled.

While certain embodiments have been described, these embodiments have been presented by way of example only, and are not intended to limit the scope of the inventions. Indeed, the novel embodiments described herein may be embodied in a variety of other forms, furthermore, various omissions, substitutions and changes in the form of the embodiments described herein may be made without departing from the spirit of the inventions. The embodiments and variations thereof are included within the scope and spirit of the invention, and are included within the scope of the appended claims and their equivalents.

What is claimed is:

1. A heating device, comprising:

a substrate;

a heating element on the substrate;

a heat conductor contacting the substrate;

a plurality of thermometers; and a plurality of thermostats, each of the thermostats contacting the heat conductor and configured to interrupt electrical power supplied to the heating element, wherein the thermometers and the thermostats are arranged in a longitudinal direction of the substrate with at least one of the thermometers between adjacent two of the thermostats.

2. The heating device according to claim 1, wherein the thermometers and the thermostats are arranged along a longitudinal center line of the substrate.

3. The heating device according to claim 1, wherein each of the thermostats has a surface facing the heat conductor, and an area of the surface of each of the thermostats is smaller than an area of the heating element on the substrate.

4. The heating device according to claim 1, wherein the thermometers contact the heat conductor.

5. The heating device according to claim 1, wherein the heating element extends in the longitudinal direction of the substrate.

6. The heating device according to claim 1, wherein at least one of the thermometers overlaps with the heat element when viewed from a direction perpendicular to the substrate.

7. The heating device according to claim 1, wherein at least one of the thermostats overlaps with the heating element when viewed from a direction perpendicular to the substrate.

8. The heating device according to claim 1, further comprising:

a cylindrical film to be heated by the heating element and supported in a rotatable manner.

9. The heating device according to claim 8, wherein the substrate, the heating element, the thermometers, and the thermostats are inside the cylindrical film.

10. The heating device according to claim 8, further comprising:

a support member that supports the substrate inside the cylindrical film.

11. The heating device according to claim 1, wherein the plurality of thermostats are connected in series.

12. The heating device according to claim 1, wherein the heating element includes a center element and at least an end element that are connected in parallel, and the plurality of thermostats includes a first thermostat at a position corresponding to the center element and a second thermostat at a position corresponding to the end element.

13. An image processing apparatus, comprising:

an image forming unit; and a heating device by which a sheet is heated and including:

a substrate, a heating element on the substrate, a heat conductor contacting the substrate, a plurality of thermometers, and a plurality of thermostats, each of the thermostats contacting the heat conductor and configured to interrupt electrical power supplied to the heating element, wherein the thermometers and the thermostats are arranged in a longitudinal direction of the substrate with at least one of the thermometers between adjacent two of the thermostats.

14. The image processing apparatus according to claim 13, wherein the thermometers and the thermostats are arranged along a longitudinal center line of the substrate.

15. The image processing apparatus according to claim 13, wherein each of the thermostats has a surface facing the heat conductor, and an area of the surface of each of the thermostats is smaller than an area of the heating element on the substrate.

16. The image processing apparatus according to claim 13, wherein the thermometers contact the heat conductor.

17. The image processing apparatus according to claim 13, wherein the heating elements extend in the longitudinal direction of the substrate.

18. The image processing apparatus according to claim 13, wherein at least one of the thermometers overlaps with the heat element when viewed from a direction perpendicular to the substrate.

19. The image processing apparatus according to claim 13, wherein at least one of the thermostats overlaps with the heating element when viewed from a direction perpendicular to the substrate.

20. The image processing apparatus according to claim 13, wherein the heating device further includes a cylindrical film to be heated by the heating element and supported in a rotatable manner.

* * * * *